United States Patent [19]

Sugiyama

[11] 4,427,206
[45] Jan. 24, 1984

[54] OIL SEAL ASSEMBLY WITH UNBONDED BACKUP RING

[75] Inventor: Masahiro Sugiyama, Hiratsuka, Japan

[73] Assignee: Keeper Co., Ltd., Tokyo, Japan

[21] Appl. No.: 503,559

[22] Filed: Jun. 13, 1983

[30] Foreign Application Priority Data

Jul. 20, 1982 [JP] Japan .............................. 57-108884[U]
Jul. 26, 1982 [JP] Japan .............................. 57-112220[U]

[51] Int. Cl.³ ............................................... F16J 15/32
[52] U.S. Cl. .................................... 277/153; 277/166; 277/186
[58] Field of Search ............... 277/166, 181, 186, 152, 277/153, 188 R, 189, 192, 199

[56] References Cited

U.S. PATENT DOCUMENTS 3,746,351  7/1973  Tucker ................... 277/153
4,053,166 10/1977  Domkowski ........... 277/152
4,240,643 12/1980  Becker et al. ........ 277/186 X

FOREIGN PATENT DOCUMENTS 2229682  1/1974  Fed. Rep. of Germany ...... 277/152
34-15919 10/1959 Japan .
57-8338   2/1982  Japan .
556596   10/1943  United Kingdom ................ 277/152
962097    6/1964  United Kingdom ................ 277/152

Primary Examiner—Robert S. Ward, Jr.
Attorney, Agent, or Firm—Wegner & Bretschneider

[57] ABSTRACT

An oil seal assembly 1 for forming a seal between a wall of a machine housing 3 and a rotatable shaft 10 extending through said wall to prevent a fluid from leaking from inside to the outside of said housing through the gap between said wall and said shaft. The oil seal assembly comprises an elastic seal ring 7 made of an elastic material and having a base portion for fitting to the wall, a lip portion 5 with a lip edge 8 for resilient sliding contact with the surface of the shaft, and a lip neck portion 6 through which the lip portion is connected to the base portion. The oil seal assembly further comprises a reinforcement ring 4 made of a comparatively stiff material and associated with said base portion of said elastic seal ring. A backup ring 2 is made of a synthetic resin and seated in a gap formed between the inner peripheral surface of the lip neck portion and the radially inward portion of the reinforcement ring without being bonded to the lip neck portion and to the radially inward portion of said reinforcement ring.

3 Claims, 6 Drawing Figures

OIL SEAL ASSEMBLY WITH UNBONDED BACKUP RING

BACKGROUND OF THE INVENTION

The present invention relates to an oil seal assembly for forming a liquid tight seal between a wall of a stationary housing and a rotatable shaft extending through the wall of the housing to prevent a fluid from leaking from the inside to the outside of the housing along the shaft. More particularly, the invention is concerned with an oil seal assembly of the kind described above, provided with a backup ring for backing up the lip neck portion of an elastic seal ring.

In the field of machines having a shaft rotatably mounted in a housing to project outwardly from the housing through a housing wall, it is well known to use an oil seal assembly for preventing any leak of an internal fluid to the outside of the machine through the gap between the shaft and the housing wall. Usually, the oil seal assembly is provided with a backup ring for backing up a seal member.

An oil seal assembly having a backup ring is shown, for example, in Japanese Patent Publication No. 8338/1982. In this oil seal assembly, the backup ring is constituted by a part of a metallic ring having a substantially U-shaped cross-section and composed of two segments. More specifically, one of the two segments of the metallic ring is wholly coated with an adhesive and is bonded by firing to an elastic seal ring having a lip during the forming of the elastic seal ring, while the other segment is not bonded so that the elastic seal ring is freed from the metallic ring only at the portion thereof around the lip. In this type of oil seal assembly, however, it is necessary to machine the outer peripheral surface of the non-bonded segment in exact conformity with the inner peripheral configuration of the lip neck portion of the elastic seal ring. This machining is considerably difficult and troublesome to conduct. In addition, the rubber used as the material of the elastic seal ring tends to flow into the inner periphery of the backup ring to form burrs, by the pressure applied thereto during the formation of the elastic seal ring together with the backup ring.

On the other hand, Japanese Utility Model Publication No. 15919/1959 discloses an oil seal assembly with a backup ring in which the backup ring is fitted to the elastic seal ring after the formation of the latter. In this case, however, the productivity is impractically low due to the necessity of the fitting work. In addition, it is difficult to obtain a close fit between the backup ring and the inner peripheral surface of the lip neck portion of the elastic seal ring and, hence, the durability of the elastic seal ring is impaired disadvantageously. It is to be pointed out also that the backup ring is pressed onto the rotating shaft when a pressure is applied to the seal so that the backup ring is undesirably rotated together with the shaft to damage the oil seal assembly. Furthermore, the backup ring is required to have an antidust lip for preventing dust from coming into the housing.

SUMMARY OF THE INVENTION

Accordingly, an object of the invention is to provide an improved oil seal assembly with backup ring, capable of obviating the above-described problems of the prior art.

To this end, according to the invention, there is provided an oil seal assembly for forming a seal between a wall of a machine housing and a rotatable shaft extending through the wall to prevent a fluid from leaking from inside to the outside of the housing through the gap between the wall and the shaft, the oil seal assembly comprising: an elastic seal ring made of an elastic material and having a base portion for fitting to the wall, a lip portion with a lip edge for resilient sliding contact with the surface of the shaft, and a lip neck portion through which the lip portion is connected to the base portion; a reinforcement member made of a comparatively stiff material and associated with the base portion of the elastic seal ring; and a backup ring made of a synthetic resin and seated in the gap formed between the inner peripheral surface of the lip neck portion and the reinforcement ring without being bonded to the lip neck portion and the reinforcement ring.

The above and other objects, features and advantages of the invention will become clear from the following description of the preferred embodiments taken in conjunction with the accompanying drawings.

DESCRIPTION OF THE PREFERRED EMBODIMENTS

Figure 1:
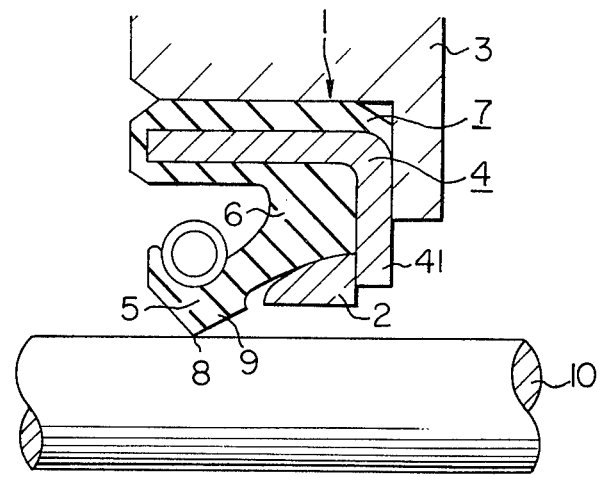
FIG. 1 is a sectional view of an embodiment of the oil seal assembly in accordance with the invention under the use.

Referring first to FIG. 1, an oil seal assembly embodying the present invention is generally designated at a reference numeral 1. The oil seal assembly 1 is mounted between a wall 3 of the housing of a machine and a rotatable shaft 10 extending through the wall 3 of the housing to provide a seal therebetween for preventing any leak of fluid from the inside to the outside of the housing through the gap between the wall 3 and the shaft 10. The oil seal assembly 1 is constituted mainly by an elastic seal member 7, a reinforcement ring 4, and a backup ring 2. The elastic seal ring 7 has a base portion with an annular recess of a substantially U-shaped cross-section for receiving one limb of the reinforcement ring 4 which has a substantially L-shaped cross-section as illustrated. The elastic seal ring 7 further has a lip portion 5 connected to one of the walls defining the U-shaped annular recess through a lip neck portion 6. The lip portion 5 makes a resilient sliding contact with the surface of the shaft 10 at its lip edge 8, so that a seal is formed between the lip edge 8 and the surface of the shaft 10 to prevent any leak of fluid from the inside to the outside of the housing. The backup ring 2 is made from a synthetic resin having sufficient resistance to sustain pressure and heat applied during the formation of the seal ring 7. Examples of such resin is polytetrafluoroethylene, polyamide resins and so forth. In the production of the oil seal assembly of this embodiment, the backup ring formed from the above-mentioned material is placed as an insert within the cavity of a mold for forming the seal ring 7 so that, in the completed assembly, the backup ring 2 is seated in an annular gap formed between the inner peripheral surface of the lip neck portion 6 and the radially inward limb 41 of the reinforcement ring 4 without being bonded to the seal ring 7 and the reinforcement ring 4. The reinforcement ring 4 is bonded to the seal ring 7 at its entire portion except the radially inner end during the vulcanization of the seal ring 7. In this embodiment, the backup ring 2 makes a close fit to the inner peripheral surface of the lip neck portion 6 without necessitating any troublesome machining or processing, because it is assembled together with the seal ring 7 during forming of the latter within a mold cavity. Although the inner peripheral surface of the lip neck portion 6 is not bonded to the backup ring 2 but is freed from the latter, the backup ring does never rotate apart from the seal ring 7 because it does not make direct contact with the rotating shaft 10. The lip portion 5, therefore, is effectively and stably backed up by the backup ring to make close contact with the surface of the shaft 10 to maintain a sufficiently tight seal against the leakage of the fluid. The lip portion 5 can hardly be deflected even when the pressure of the fluid in the housing is increased, because it is effectively backed up by the backup ring 2. If the lip portion is allowed to deflect freely, the seal surface 9 of the seal ring 7 will make contact with the shaft surface over an abnormally wide area to cause an extraordinary wear of the seal ring. This problem, however, is obviated thanks to the stable backup function provided by the backup ring 2.

Figure 2:
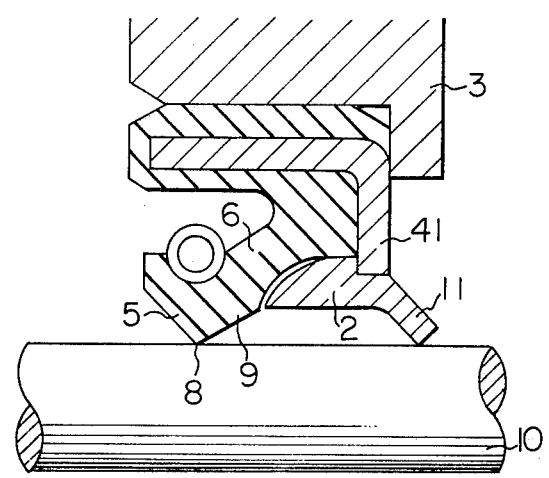
FIG. 2 is a sectional view of another embodiment of the oil seal assembly in accordance with the invention under the use.

FIG. 2 shows another embodiment which is materially identical to the first embodiment shown in FIG. 1 except that the backup ring 2 is provided with a dust strip 11 extending therefrom outwardly in the axial direction of the shaft to make a resilient contact with the latter. Thus, in this embodiment, the shaft 10 is resiliently and slidingly contacted not only by the lip edge 8 but also by the dust strip 11. The dust strip serves mainly to prevent dust and other foreign matters from coming into the oil seal assembly.

Figure 3:
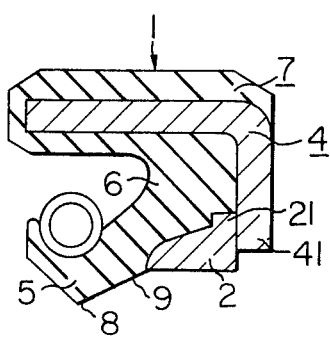
FIG. 3 is a sectional view of still another embodiment of the oil seal assembly in accordance with the invention in the state out of use.
Figure 4:
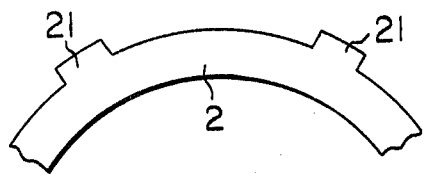
FIG. 4 is a plan view of a part of a backup ring incorporated in the oil seal assembly in accordance with the invention.

FIGS. 3 and 4 in combination show still another embodiment. The backup ring 2 is seated, as in the case of the foregoing embodiments, within the annular gap formed between the inner peripheral surface of the lip neck portion 6 and the limb 41 of the reinforcement ring 4. In this embodient, however, a plurality of radial projections 21 are formed on the outer peripheral surface of the backup ring 2 to project radially outwardly therefrom. These radial projections 21 are received by corresponding recesses formed in the inner peripheral surface of the lip neck portion 6 as will be clearly seen from FIG. 3. It will be understood that the undesirable rotation of the backup ring 2 is effectively avoided thanks to the mutual engagement between the radial projections and the recesses.

Figure 5:
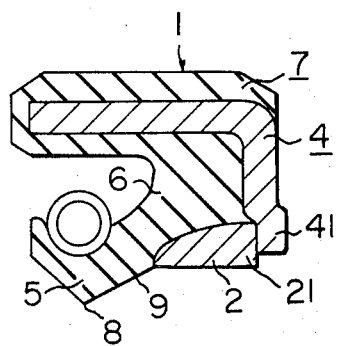
FIG. 5 is a sectional view of a further embodiment of the oil seal assembly in accordance with the invention in the state out of use.
Figure 6:
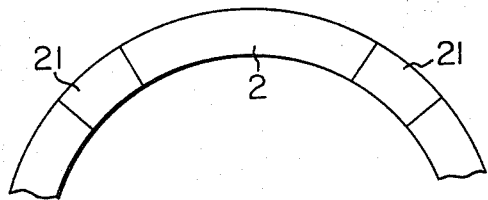
FIG. 6 is a plan view of another example of the backup ring incorporated in the oil seal assembly of the invention.

FIGS. 5 and 6 in combination show a further embodiment of the invention in which a plurality of axial projections 21 formed on one side surface of the backup ring 2 fit in corresponding axial recesses formed in the limb 41 of the reinforcement ring 4 as shown in FIG. 5. The undesirable rotation of the backup ring 2 is prevented also in this case, thanks to the mutual engagement between the axial projections and recesses. In this case, the axial recesses formed in the reinforcement ring 4 may be substituted by notches formed through the thickness of the limb 41.

To sum up, the present invention offers the following advantages.

Firstly, the backup ring 2 is mounted in the oil seal assembly during the forming of the seal ring 7 as an insert in the mold cavity. The backup ring 2, therefore, can make a close fit to the core mold under the forming pressure, even if the backup ring 2 is not finished so precisely. Therefore, no bur is left on the surface of the backup ring 2 opposing to the inner peripheral surface of the lip neck portion of the formed seal ring 7, and the backup ring 2 is stably seated in the annular gap left between the inner peripheral surface of the lip neck portion 6 and the limb 41 of the reinforcement ring 4, without being bonded to the lip neck portion and to the reinforcement ring 4. In consequence, the seal ring 7 is stably backed up by the backup ring 2 to effectively and stably seal the gap between the housing wall 3 and the rotating shaft 10. In addition, the undesirable rotation of the backup ring 2 together with the rotating shaft 10 is avoided even if the backup ring 2 is contacted by the rotating shaft, because the backup ring 2 is stably seated in the aforesaid annular gap, so that the seal ring 7 is protected against any damage which may, for otherwise, be caused by the rotation of the backup ring 2. The backup ring effectively and stably backs up the seal ring to prevent deflection of the lip portion 5 of the seal ring so that a sufficiently tight seal is maintained to withstand a large change in the pressure of the fluid in the housing. In consequence, according to the invention, it is possible to produce a reliable oil seal assembly having a superior and long-lasting sealing effect and capable of withstanding a high internal pressure, at a moderate cost and at a high productivity.

Although the invention has been described through specific terms, it is to be noted here that the described embodiment is not exclusive and various changes and modifications may be imparted thereto without departing from the scope of the invention which is limited solely by the appended claims.

What is claimed is:

1. An oil seal assembly for forming a seal between a wall of a machine housing and a rotatable shaft extending through said wall to prevent a fluid from leaking from inside to the outside of said housing through the gap between said wall and said shaft, said oil seal assembly comprising:
    an elastic seal ring made of an elastic material and having a base portion for fitting to said wall, a lip portion with a lip edge for resilient sliding contact with the surface of said shaft, and a lip neck portion through which said lip portion is connected to said base portion;
    a reinforcement member made of a comparatively stiff material and associated with said base portion of said elastic seal ring; and
    a backup ring made of a synthetic resin and seated in a gap formed between the inner peripheral surface of said lip neck portion and the radially inward portion of said reinforcement ring without being bonded to said lip neck portion and to said radially inward portion of said reinforcement ring.

2. An oil seal assembly according to claim 1, wherein said backup ring is provided with a dust strip adapted to make a resilient contact with the surface of said shaft.

3. An oil seal assembly according to claim 1, wherein said backup ring is provided with at least one projection fitted in a corresponding recess formed in said lip neck portion of said elastic seal ring or in said radially inward portion of said reinforcement ring, whereby said backup ring is prevented from rotating together with said shaft.

* * * * *